3,015,818
RANGE SLEWING SWITCH FOR AIRBORNE RADAR

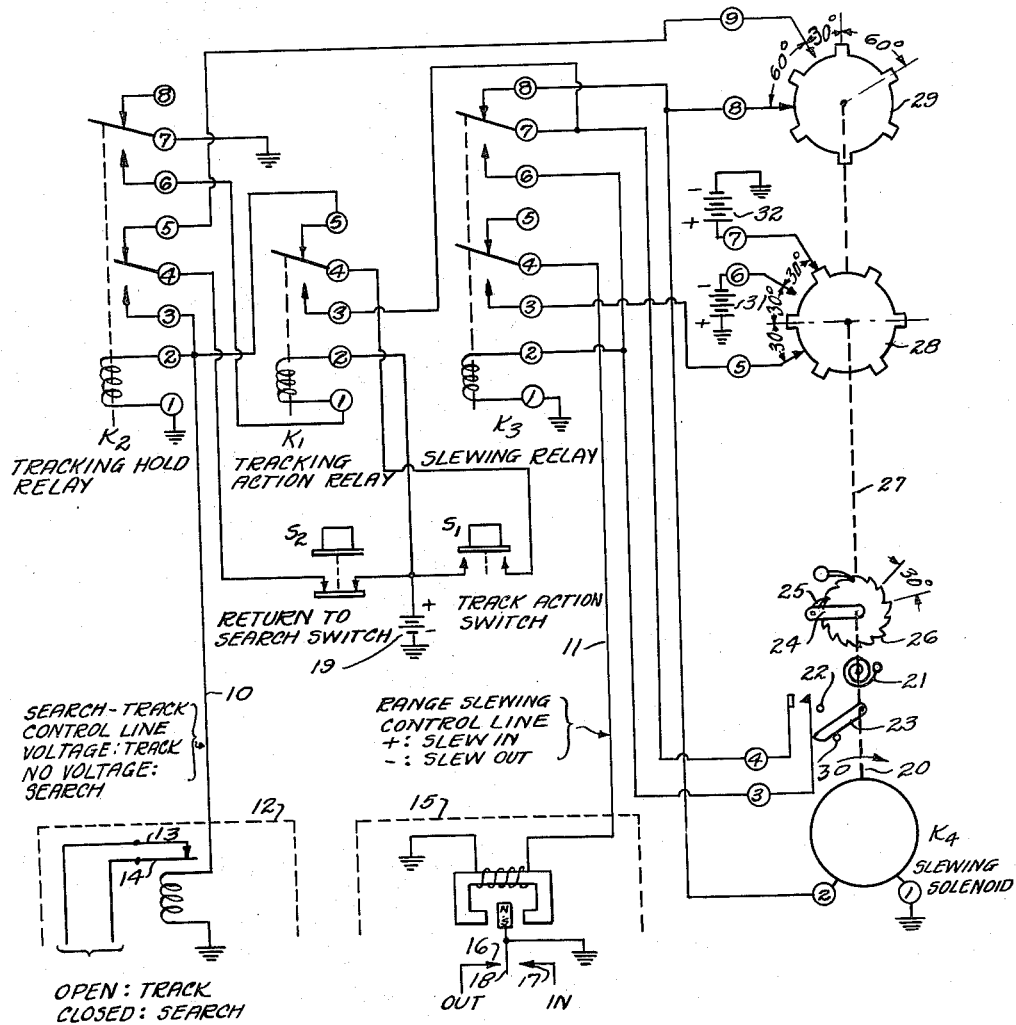

Donald J. Oda and Robert L. McCollor, Runnemede, N.J., assignors to the United States of America as represented by the Secretary of the Air Force
Filed Mar. 28, 1958, Ser. No. 724,783
3 Claims. (Cl. 343—7.3)

This invention relates to airborne radar systems having provisions for scanning a predetermined area and, upon locating a target in the area, for tracking the target in both direction and range.

It is the object of the invention to provide means through which a simple single-pole-single-throw normally open push button switch, which may be mounted on the control stick of an aircraft, may be used to change the radar from the search mode of operation to the tracking mode and to slew the range gate either out or in as desired. The arrangement is such that the first depression of the push button causes the radar to change to the tracking mode and the range gate to slew outward. Subsequent depressions of the push button cause the gate to slew alternately inward and outward. A second normally closed push button is provided to return the radar to the search mode.

A more detailed description of the invention will be given with reference to the specific embodiment thereof shown in the accompanying drawing.

Referring to the drawing, the switching arrangement to be described has two output control lines 10 and 11. With respect to line 10, designated the search-track control line, the arrangement is such that the radar is in the search mode of operation when this line is deenergized and may be changed to the tracking mode by applying a voltage to the line. Block 12 represents the apparatus required to make this conversion. Radar systems having search and tracking modes of operation with apparatus for changing between the two modes are well known in the art. An example may be found in U.S. Patent 2,446,024, July 27, 1948, to R. W. Porter et al. Relay contacts 13—14 may replace switch 80 in FIG. 3 of this patent. With respect to line 11, designated the range slewing control line, the arrangement is such that a negative voltage on this line causes the range gate to slew outward and a positive voltage causes it to slew inward. Block 15 represents the apparatus required to effect this slewing of the range gate. Automatic range tracking systems and the manner in which range gates are generated and controlled for this purpose are well known in the radar art. An example may be found in U.S. Patent 2,708,750, May 17, 1955, to B. M. Oliver. Contacts 16, 17 and 18 may replace switch 148 in FIG. 4 of that patent.

Push button switch $S_1$ controls the change from search mode to tracking mode and the slewing of the range gate. It is placed at a position of maximum convenience to the pilot, such as on the aircraft control stick. Push button switch $S_2$, which is for returning the radar to the search phase, may be placed at a less convenient location if desirable. When these two switches are in their normal states, $S_1$ open and $S_2$ closed, relays $K_1$, $K_2$ and $K_3$ are deenergized. With $K_2$ deenergized, there is no voltage on control line 10, so the radar is in its search mode of operation. Also, with $K_3$ deenergized, no range gate slewing control voltage is applied to control line 11.

If $S_1$ is depressed and held down voltage is applied from source 19 through contacts 4—5 of tracking action relay $K_1$ to terminal 2 of tracking hold relay $K_2$ energizing this relay. Relay $K_2$ holds by voltage from source 19 applied through $S_2$ and its own contacts 4—3. Energization of $K_2$ also causes contact 1 of $K_1$ to be connected to ground through contacts 6—7 of $K_2$ thus energizing $K_1$. The voltage now on contact 3 of $K_2$ is applied to control line 10 changing the radar from the search mode to the tracking mode of operation.

When $K_1$ closes, voltage is applied from source 19 through $S_1$, contacts 4—3 of $K_1$ and contacts 7—8 of $K_3$ to contact 2 of slewing solenoid $K_4$, energizing this solenoid. $K_4$ may be a rotary solenoid which, upon energization, rotates shaft 20 clockwise against coil spring 21 through 30° as determined by stop 22 and arm 23. Arm 24 and pawl 25, attached to shaft 20, rotate ratchet wheel 26 and shaft 27 attached thereto 30° clockwise advancing contact wheels 28 and 29 through the same angle. Also, clockwise rotation of shaft 20 causes arm 23 to close contacts 3—4 of $K_4$ which causes voltage to be applied from contact 7 of $K_3$ to contact 2 of $K_3$ thus energizing $K_3$ which holds through its own contacts 7—6. The resulting opening of contacts 7—8 of $K_3$ deenergizes the solenoid $K_4$ which allows it and shaft 20 to rotate counterclockwise under the influence of spring 21 to its original position as determined by stop 30. Although contacts 3—4 of $K_4$ are now open, relay $K_3$ remains energized because of the holding circuit through its contacts 7—6.

The above described 30° rotation of $K_4$ resulted in the contacts 5—6 now being closed. Therefore, with $K_3$ energized, negative voltage is applied from source 31 through contacts 6—5 of $K_4$ and 3—4 of $K_3$ to control line 11. This causes contacts 16—18 to close and the range gate to slew outward as described in the above cited patent to Oliver. Negative voltage remains on line 11 as long as $S_1$ is held closed. Release of this switch breaks the holding circuit of $K_3$, which existed through contacts 4—3 of $K_1$ and contacts 7—6 of $K_3$, allowing $K_3$ to open and removing the voltage from line 11 at its contacts 3—4.

If $S_1$ is now depressed a second time, solenoid $K_4$ is energized, through contacts 3—4 of $K_1$ and 7—8 of $K_3$ as before, and advances shaft 27 another 30°, closing contacts 5—7 of $K_4$. Also, as before, energization of $K_4$ causes $K_3$ to be energized and held closed at its contacts 7—6. With contacts 7—5 of $K_4$ closed, positive potential is applied from source 32 through contact 4—3 of $K_3$ to control line 11. This positive voltage causes contacts 17—18 to be closed and the range gate to slew inward. The voltage remains on line 11 until $S_1$ is released as before.

A third closure of $S_1$ causes $K_4$ to advance 30° for the third time. This again closes contacts 5—6 of $K_4$ and results in a negative potential again being applied to line 11, causing an outward slewing of the range gate. Therefore, the slewing direction of the range gate is reversed at each closure of $S_1$, solenoid $K_4$ and its associated contacts acting as a voltage actuated polarity selecting device that reverses the polarity at an output terminal 5 of $K_4$, each time an actuating voltage is applied to the solenoid.

When it is desired to return the radar to the search mode of operation, push button $S_2$ is depressed. This breaks the holding circuit of $K_2$ releasing this relay which in turn, through opening of its contacts 6—7, releases relay $K_1$. Since $K_3$ was deenergized when $S_1$ was released, the circuit is now returned to its original state with control lines 10 and 11 deenergized.

In order to insure that the initial depression of $S_1$ will always cause the range gate to slew outward (control line 11 negative) provision is made to insure that $K_4$ always stops with contacts 5—7 closed, as shown in the drawing. This result is insured by relay $K_2$ and contacts 8—9 of $K_4$. If $K_4$ stops in the correct position (5—7 closed) contacts 8—9 are open. If, however, $K_4$ stops in the incorrect position (5—6 closed) contacts 8—9 are closed and release of $S_2$ causes voltage to be applied from source 19 through $S_2$, contacts 4—5 of $K_2$ and contacts 9—8 of $K_4$ to contact 2 of $K_4$, thus stepping $K_4$ 30° to the correct position. This actuation of $K_4$ does not result in energization of $K_3$ since $S_1$ is open.

We claim:

1. In combination with airborne radar apparatus having a search mode of operation and a tracking mode of operation, said tracking mode including automatic range tracking by means of a slewable range gate, and having first and second control lines, said apparatus operating in said search mode when said first control line is deenergized and in said tracking mode when energized, and said range gate being slewed outward when a negative potential is applied to said second control line and inward when a positive potential is applied thereto, switching means for controlling the energization of said control lines and thereby the conversion of said apparatus between search and tracking modes and the slewing of said range gate, said apparatus comprising: a two-stage voltage actuatable polarity selecting means comprising an output terminal and means operative in one state to apply a voltage of one polarity to said output terminal and in the other state to apply a voltage of opposite polarity to said output terminal, said polarity selecting means changing from whichever state it is in to the other each time an actuating voltage is applied thereto; a source of electrical power; a single-pole single-throw normally open switch having one terminal connected to said source; means operative upon closure of said switch to connect said first control line to said source and to connect the other terminal of said switch to said polarity selecting means for applying an actuating voltage thereto; means operative upon actuation of said polarity selecting means to break the connection between the other terminal of said switch and said polarity selecting means and to connect said output terminal to said second control line; and means operative upon opening of said switch to disconnect said output terminal from said second control line and to reconnect said other terminal of said switch to said polarity reversing means.

2. In combination with airborne radar apparatus having a search mode of operation and a tracking mode of operation, said tracking mode including automatic range tracing by means of a slewable range gate, and having first and second control lines, said apparatus operating in said search mode when said first control line is deenergized and in said tracking mode when energized, and said range gate being slewed outward when a negative potential is applied to said second control line and inward when a positive potential is applied thereto, switching means for controlling the energization of said control lines and thereby the conversion of said apparatus between search and tracking modes and the slewing of said range gate, said apparatus comprising: a two-state voltage actuatable polarity selecting means comprising an output terminal and means operative in one state to apply a voltage of one polarity to said output terminal and in the other state to apply a voltage of opposite polarity to said output terminal, said polarity selecting means changing from whichever state it is in to the other each time an actuating voltage is applied thereto; a source of electrical power; a first switch of the single-pole single-throw normally open type having one terminal connected to said source; a second switch of the single-pole single-throw normally closed type; means operative upon closure of said first switch to connect said first control line through said second switch to said source and to connect the other terminal of said first switch to said polarity selecting means for applying an actuating voltage thereto; means operative upon actuation of said polarity selecting means to break the connection between the said other terminal of said first switch and said polarity selecting means and to connect said output terminal to said second control line; means operative upon opening of said first switch to disconnect said output terminal from said second control line and to reconnect said other terminal of said first switch to said polarity selecting means; and means operative upon opening of said second switch to disconnect said first control line from said source and to break the connection between the said other terminal of said first switch and said polarity selecting means.

3. Apparatus as claimed in claim 2 in which said polarity selecting means contains additional means operative when said polarity selecting means is in a predetermined one of said two states and upon closure of said second switch to apply an actuating voltage to said polarity selecting means.

References Cited in the file of this patent

UNITED STATES PATENTS 2,572,986     Chance _____ Oct. 30, 1951